United States Patent
Mitsumaki et al.

(10) Patent No.: US 11,200,586 B2
(45) Date of Patent: Dec. 14, 2021

(54) INFORMATION PROCESSING APPARATUS AND NON-TRANSITORY COMPUTER-READABLE RECORDING MEDIUM

(71) Applicant: Toyota Jidosha Kabushiki Kaisha, Toyota (JP)

(72) Inventors: Koichiro Mitsumaki, Nagoya (JP); Masato Endo, Nagakute (JP); Ryota Kondo, Nagoya (JP); Yasuhisa Obata, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 78 days.

(21) Appl. No.: 16/359,653

(22) Filed: Mar. 20, 2019

(65) Prior Publication Data

US 2019/0295108 A1 Sep. 26, 2019

(30) Foreign Application Priority Data

Mar. 22, 2018 (JP) .............................. JP2018-054960

(51) Int. Cl.
*G06Q 10/02* (2012.01)
*G06Q 30/02* (2012.01)
(Continued)

(52) U.S. Cl.
CPC ..... *G06Q 30/0202* (2013.01); *G01C 21/3438* (2013.01); *G01C 21/3484* (2013.01);
(Continued)

(58) Field of Classification Search
CPC .... G06Q 10/00; G06Q 40/00; G06Q 30/0202; G06Q 10/02; G06Q 50/30; G01C 21/3438; G01C 21/3484; G08G 1/202
(Continued)

(56) References Cited

U.S. PATENT DOCUMENTS 6,701,300 B1 * 3/2004 Murakami ....... G06Q 10/06315
                                                    705/7.25
6,842,719 B1 * 1/2005 Fitzpatrick ............. G06Q 10/06
                                                    702/182
(Continued)

FOREIGN PATENT DOCUMENTS

JP     2003-162576 A     6/2003
JP     2012-181582 A     9/2012
(Continued)

OTHER PUBLICATIONS

Haaf et al "Forecasting light-duty vehicle demand using alternative-specific constants for endogeneity correction versus calibration", Dec. 2016, ScienceDirect, pp. 182-210 (Year: 2016).*

*Primary Examiner* — Romain Jeanty
(74) *Attorney, Agent, or Firm* — Dinsmore & Shohl LLP

(57) ABSTRACT

An information processing apparatus includes an acquisition unit configured to acquire at least one of weather information and time information of a predetermined area as an environmental parameter, a use history unit configured to acquire a use history including a use section, a use time, and vehicle information of a vehicle previously used by a user, a prediction unit configured to perform a demand prediction of a vehicle to be used by the user based on correspondence information with the environmental parameter and the use history stored in association with each other, and a vehicle arrangement plan output unit configured to output a plan of arrangement locations of the vehicles planed based on the demand prediction of the vehicle performed by the demand prediction unit.

4 Claims, 10 Drawing Sheets

(51) Int. Cl.
*G01C 21/34* (2006.01)
*G08G 1/00* (2006.01)
*G06Q 50/30* (2012.01)

(52) U.S. Cl.
CPC ............ *G06Q 10/02* (2013.01); *G06Q 50/30* (2013.01); *G08G 1/202* (2013.01)

(58) Field of Classification Search
USPC ................................................ 705/7.39, 7.31
See application file for complete search history.

(56) References Cited

U.S. PATENT DOCUMENTS

| | | | |
|---|---|---|---|
| 10,685,297 B2* | 6/2020 | Meyer | G06Q 50/14 |
| 2008/0195428 A1* | 8/2008 | O'Sullivan | G06Q 10/00 |
| | | | 705/6 |
| 2011/0000747 A1* | 1/2011 | Wu | G06Q 10/04 |
| | | | 187/383 |
| 2012/0323642 A1* | 12/2012 | Camp | G06Q 10/06 |
| | | | 705/13 |
| 2013/0246301 A1* | 9/2013 | Radhakrishnan | G06Q 30/0282 |
| | | | 705/347 |
| 2016/0247327 A1* | 8/2016 | Kozawa | G06Q 10/06 |
| 2019/0051174 A1* | 2/2019 | Haque | G01C 21/3438 |

FOREIGN PATENT DOCUMENTS

| | | |
|---|---|---|
| JP | 2014-032531 A | 2/2014 |
| JP | 2016-095750 A | 5/2016 |
| JP | 2017-010189 A | 1/2017 |
| WO | 2015/050242 A1 | 4/2015 |

\* cited by examiner

FIG. 3

ENVIRONMENTAL PARAMETER DB

| DATE | TIME | LOCATION | WEATHER |
|---|---|---|---|
| | ... | ... | ... |
| | 6:00 TO 9:00 | A-KU, TOKYO | FINE |
| | | B-KU, TOKYO | RAIN |
| | | C-SHI, KANAGAWA-KEN | FINE |
| | ... | ... | ... |
| JANUARY 15 | 12:00 TO 13:00 | A-KU, TOKYO | CLOUDY |
| | | B-KU, TOKYO | CLOUDY |
| | | C-SHI, KANAGAWA-KEN | FINE |
| | ... | ... | ... |
| | 18:00 TO 21:00 | A-KU, TOKYO | RAIN |
| | | B-KU, TOKYO | RAIN |
| | | C-SHI, KANAGAWA-KEN | FINE |
| | ... | ... | ... |
| ... | ... | ... | ... |

FIG. 4

USE RESERVATION DB

| USER ID | VEHICLE TYPE | COLOR | ACCESSORY | VARIOUS KINDS OF INFORMATION | GETTING-IN PLACE | | | GETTING-OFF PLACE | |
|---|---|---|---|---|---|---|---|---|---|
| | | | | | GETTING-IN POINT | DEPARTURE DATE AND TIME | RETURN DATE AND TIME | GETTING-OFF POINT | DEPARTURE DATE AND TIME |
| U01 | XXX | WHITE | ... | JANUARY 15 ALL DAY ONE-WAY | HOME (A-KU, TOKYO) | JANUARY 15 | — | STORE M (B-SHI, KANAGAWA-KEN) | — |
| U02 | XXX | BLACK | ... | JANUARY 15 10:00 TO 17:00 ROUND-TRIP | HOME (A-KU, TOKYO) | JANUARY 15, 10:00 | JANUARY 15, 17:00 | STORE M (B-SHI, KANAGAWA-KEN) | JANUARY 15, 14:00 |
| U03 | XXX | DARK BLUE | ... | JANUARY 15 FORENOON ROUND-TRIP | HOME (A-KU, TOKYO) | JANUARY 15, 9:00 | JANUARY 15, 12:00 | STORE M (B-SHI, KANAGAWA-KEN) | JANUARY 15, 12:00 |
| U04 | YYY | WHITE | ... | JANUARY 16 ALL DAY ONE-WAY | HOME (C-SHI, KANAGAWA-KEN) | JANUARY 16 | — | STORE M (B-SHI, KANAGAWA-KEN) | — |
| U05 | YYY | BLACK | ... | JANUARY 17 AFTERNOON ROUND-TRIP | HOME (C-SHI, KANAGAWA-KEN) | JANUARY 17, 12:00 | JANUARY 17, 19:00 | STORE M (B-SHI, KANAGAWA-KEN) | JANUARY 17, 14:00 |
| ... | ... | ... | ... | ... | ... | ... | ... | ... | ... |

FIG. 5

VEHICLE INFORMATION DB

| VEHICLE ID | VEHICLE TYPE | SEATING CAPACITY | AVAILABILITY INFORMATION | STORAGE LOCATION |
|---|---|---|---|---|
| M01 | XXX | 4 | USABLE | A-SHI, TOKYO ... |
| M02 | XXX | 4 | USABLE | A-SHI, TOKYO ... |
| M03 | YYY | 5 | USABLE | A-SHI, TOKYO ... |
| M04 | YYY | 8 | IN USE | A-SHI, TOKYO ... |
| ... | ... | ... | ... | ... |

FIG. 8

| USER ID | DATE | TIME | LOCATION | WEATHER | VEHICLE TYPE | COLOR | ACCESSORY |
|---|---|---|---|---|---|---|---|
| U01 | JANUARY 15 | 6:00 TO 9:00 | A-KU, TOKYO | FINE | XXX | WHITE | ... |
| | | 9:00 TO 12:00 | A-KU, TOKYO | CLOUDY | XXX | WHITE | ... |
| | ... | ... | ... | ... | ... | ... | ... |
| U02 | JANUARY 15 | 10:00 TO 12:00 | A-KU, TOKYO | CLOUDY | XXX | BLACK | ... |
| | | 16:00 TO 17:00 | B-SHI, KANAGAWA-KEN | FINE | XXX | BLACK | ... |
| | ... | ... | ... | ... | ... | ... | ... |
| U03 | JANUARY 15 | 9:00 TO 11:00 | A-KU, TOKYO | CLOUDY | XXX | DARK BLUE | ... |
| | ... | ... | ... | ... | ... | ... | ... |

INFORMATION PROCESSING APPARATUS AND NON-TRANSITORY COMPUTER-READABLE RECORDING MEDIUM

CROSS-REFERENCE TO RELATED APPLICATIONS

This application claims priority to Japanese Patent Application No. 2018-054960 filed on Mar. 22, 2018, which is incorporated herein by reference in its entirety including the specification, drawings and abstract.

BACKGROUND

1. Technical Field

The present disclosure relates to an information processing apparatus and a non-transitory computer-readable recording medium storing an information processing program.

2. Description of Related Art

A car sharing system in which a plurality of users shares one vehicle has become widespread. The car sharing system is different from a car rental service of the related art in that a vehicle can be used for a shorter term.

When a car sharing system business is newly started, the scale of the system needs to be decided in consideration of feasibility. From a viewpoint of meeting users' demand, it is desirable to increase the number of vehicles usable as a shared vehicle. However, an increase in the number of shared vehicles results in an increase in supply and maintenance costs of a parking space at a station, in addition to an increase in supply and maintenance costs of vehicles, causing deterioration of feasibility. Accordingly, it is desirable to achieve improvement of availability of vehicles usable as a shared vehicle such that user's demand is met as much as possible and profit can be ensured.

For example, in a car sharing system of Japanese Unexamined Patent Application Publication No. 2016-095750 (JP 2016-095750 A), a technique for relaxing uneven distribution of vehicles due to concentration of user's use at a specific station is disclosed. Specifically, a degree of uneven distribution indicating strength of uneven distribution of vehicles in a predetermined area is calculated based on a distribution of vehicles that are on standby in a usable state at each station, and when the calculated degree of uneven distribution is equal to or greater than a predetermined threshold, processing for decreasing the degree of uneven distribution is executed.

SUMMARY

The processing for decreasing the degree of uneven distribution is executed as described in JP 2016-095750 A, whereby it is possible to relax uneven distribution of vehicles due to concentration of user's use at the specific station to a certain degree. However, with stopgap processing for decreasing the degree of uneven distribution of vehicles after occurrence of a situation in which the vehicles are unevenly distributed at the specific station, it may not be possible to sufficiently decrease the degree of uneven distribution depending on the magnitude of the degree of uneven distribution. Specifically, as the processing for decreasing the degree of uneven distribution in JP 2016-095750 A, processing for forwarding, to another station, a vehicle that is on standby at a usable station has been suggested; however, for example, when the number of vehicles that are on standby at the usable station is small in a time period during which use reservations for a vehicle of the users increases, there is a possibility of being incapable of coping with the situation through the forwarding processing described above. In this way, in the related art, a countermeasure for decreasing the degree of uneven distribution of the vehicles is implemented; however, a problem relating to uneven distribution of vehicles remains, and it is desirable to construct a car sharing system capable of renting vehicles to more users.

The disclosure provides an information processing apparatus and a non-transitory computer-readable recording medium storing an information processing program capable of suppressing uneven distribution of vehicles in a specific area and improving availability of vehicles stored in a car sharing system.

A first aspect of the disclosure relates to an information processing apparatus. The information processing apparatus includes an environmental parameter acquisition unit, a use history unit, a demand prediction unit, and a vehicle arrangement plan output unit. The environmental parameter acquisition unit is configured to acquire at least one of weather information and time information of a predetermined area as an environmental parameter. The use history unit is configured to to acquire a use history including a use section, a use time, and vehicle information of a vehicle previously used by a user. The demand prediction unit is configured to perform a demand prediction of a vehicle to be used by the user based on correspondence information with the environmental parameter and the use history stored in association with each other. The vehicle arrangement plan output unit is configured to output a plan of arrangement locations of the vehicles planed based on the demand prediction of the vehicle performed by the demand prediction unit.

In the information processing apparatus according to the first aspect, the vehicle information may include a color, a vehicle type, and an accessory of a vehicle. The demand prediction unit may be configured to perform a demand prediction of the vehicle to be used by the user for each predetermined area. The vehicle corresponds to the vehicle information. The vehicle arrangement plan output unit may be configured to output arrangement locations of vehicles corresponding to the vehicle information and the number of the vehicles for each predetermined area based on the demand prediction of the vehicle corresponding to the vehicle information.

In the information processing apparatus according to the first aspect, the environmental parameter acquisition unit may be configured to further acquire a degree of congestion of a road in a predetermined area. The vehicle arrangement plan output unit may be configured to output the plan of the arrangement locations of the vehicles planed based on the demand prediction of the vehicle performed by the demand prediction unit and the degree of congestion of the road.

The information processing apparatus according to the first aspect may further include a reception unit and a traveling route decision unit. The reception unit may be configured to receive a use reservation of a vehicle and store the use reservation in use reservation database. The traveling route decision unit may be configured to decide a traveling route from a location where a vehicle determined as being usable based on the use reservation is parked, toward an arrangement location of the vehicle output from the vehicle arrangement plan output unit.

The information processing apparatus according to the above-described aspect may further include a notification unit and a controller. The notification unit may be configured to notify the autonomous driving vehicle determined as being usable based on the use reservation, of the traveling route decided by the traveling route decision unit. The controller may be configured to control the vehicle notified by the notification unit, to the arrangement location of the vehicle output from the vehicle arrangement plan output unit along the traveling route.

A second aspect of the disclosure relates to a non-transitory computer-readable recording medium storing an information processing program. The information processing program causes a computer to execute acquiring at least one of weather information and time information as an environmental parameter, acquiring a use history including a use section, a use time, and vehicle information of a vehicle previously used by a user, performing a demand prediction of a vehicle to be used by the user based on correspondence information with the weather information and the time information and the use history stored in association with each other, and outputting a plan of arrangement locations of the vehicles planed based on the demand prediction of the vehicle.

According to the above-described aspects, it is possible to provide arrangement of vehicles capable of suppressing uneven distribution of vehicles in a specific area and improving availability of vehicles stored in a car sharing system.

BRIEF DESCRIPTION OF THE DRAWINGS

Features, advantages, and technical and industrial significance of exemplary embodiments will be described below with reference to the accompanying drawings, in which like numerals denote like elements, and wherein:

FIG. 3 is a table showing a specific example of an environmental parameter DB;

FIG. 4 is a table showing a specific example of a use reservation DB;

FIG. 5 is a table showing a specific example of a vehicle information DB;

FIG. 8 is a table showing an example of correspondence information;

DETAILED DESCRIPTION OF EMBODIMENTS

Figure 1:
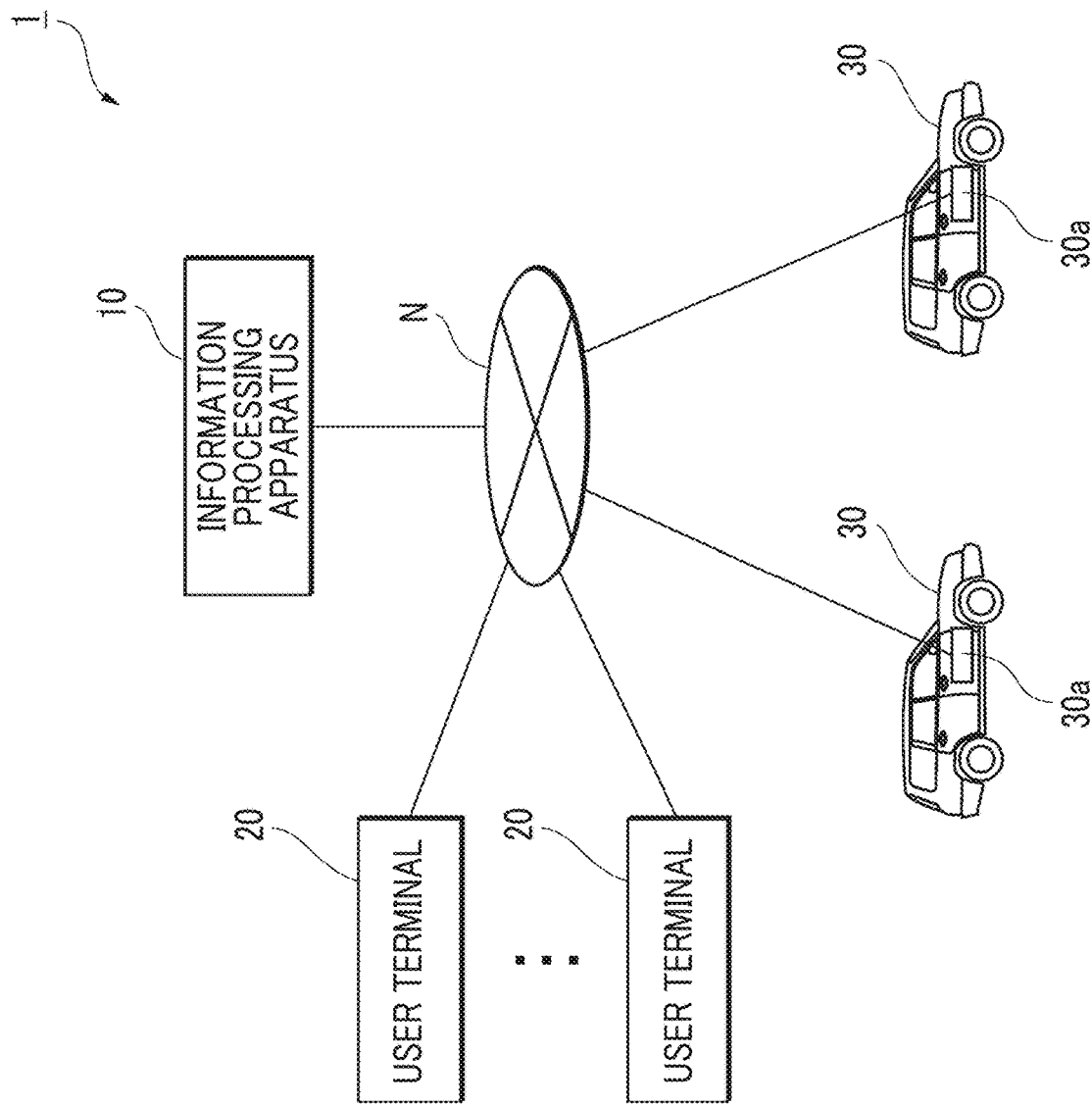
FIG. 1 is a diagram showing a configuration example of a car sharing system according to an embodiment.

Embodiments will be described referring to the accompanying drawings. In the drawings, the same reference numerals have the same or similar configurations.

System Configuration

FIG. 1 is a diagram showing a configuration example of a car sharing system 1 according to an embodiment. The car sharing system 1 includes an information processing apparatus 10, user terminals 20, and vehicles 30. In each of the vehicles 30, an in-vehicle device 30a is mounted. The information processing apparatus 10, the user terminals 20, and the in-vehicle devices 30a can perform communication with each other through a communication network N.

The car sharing system 1 performs a demand prediction of a vehicle to be used by a user for each predetermined area based on correspondence information with a predetermined environmental parameter and a use history relating to a vehicle of the user stored in association with each other, and outputs an arrangement plan of vehicles based on the demand prediction.

In general, sharing the same vehicle 30 among a plurality of users is called car sharing. The car sharing in the specification includes, for example, round-trip in which the vehicle 30 needs to be returned to a station where the vehicle 30 is rented, and one-way in which a vehicle is permitted to be returned to a station other than a station where the vehicle is rented. The disclosure is not limited thereto, and any aspect in which the users share the same vehicle 30 is included in the car sharing in the specification.

The information processing apparatus 10 receives a use reservation for car sharing from the user and registers the received use reservation in a database. A use history including a use section, a use time, and vehicle information (color, a vehicle type, an accessory, or the like of the vehicle) of the vehicle actually used by the user is also registered in the database. The information processing apparatus 10 registers an environmental parameter including weather information and time information of a predetermined area in the database. In the embodiment, a demand prediction of a vehicle to be used by the user is performed based on the correspondence information with the above-described environmental parameter and the use history stored in association with each other, and the arrangement plan of the vehicles is output based on the demand prediction of the vehicle. Details of the functions of the information processing apparatus 10 will be described below. The information processing apparatus 10 may be constituted of one or a plurality of information processing apparatuses or may be constituted using a cloud server or a virtual server.

The user terminal 20 is a terminal that is used by a user who uses the car sharing system 1, and is, for example, a smartphone, a tablet terminal, a mobile phone, a notebook personal computer, or the like. In the user terminal 20, a screen for reserving car sharing is displayed, and the user inputs various kinds of information (vehicle type, color, accessory, use section, use time, getting-in place, getting-off place, and the like) on the screen to make a use reservation for car sharing.

The vehicle 30 is a vehicle that is used by the user, and includes both of a private automobile and an automobile owned by a company. The vehicle 30 may be any vehicle as long as the vehicle is usable by the user and is movable along a free traveling route. Specifically, a vehicle 30 that a company rents for car sharing, a taxi, or a privately owned vehicle 30 may be used. The vehicle 30 is not limited to an automobile, and may be, for example, a heavy vehicle 30, such as a bus, that ten-odd people to tens of people can get in or a motorcycle. The vehicle 30 may be a vehicle 30 (hereinafter, referred to as a "manual driving vehicle") that the user drives while holding a steering wheel, or may be a vehicle 30 (hereinafter, referred to as an "autonomous driving vehicle") that can perform autonomous driving.

When the vehicle 30 is a manual driving vehicle, the in-vehicle device 30a may be a device (for example, a navigation device) that is able to display a traveling route to a destination notified from the information processing apparatus 10. When the vehicle 30 is an autonomous driving vehicle, the in-vehicle device 30a performs various kinds of control for autonomously driving the vehicle 30 along the traveling route to the destination transmitted from the information processing apparatus 10.

Functional Block Configuration

Figure 2:
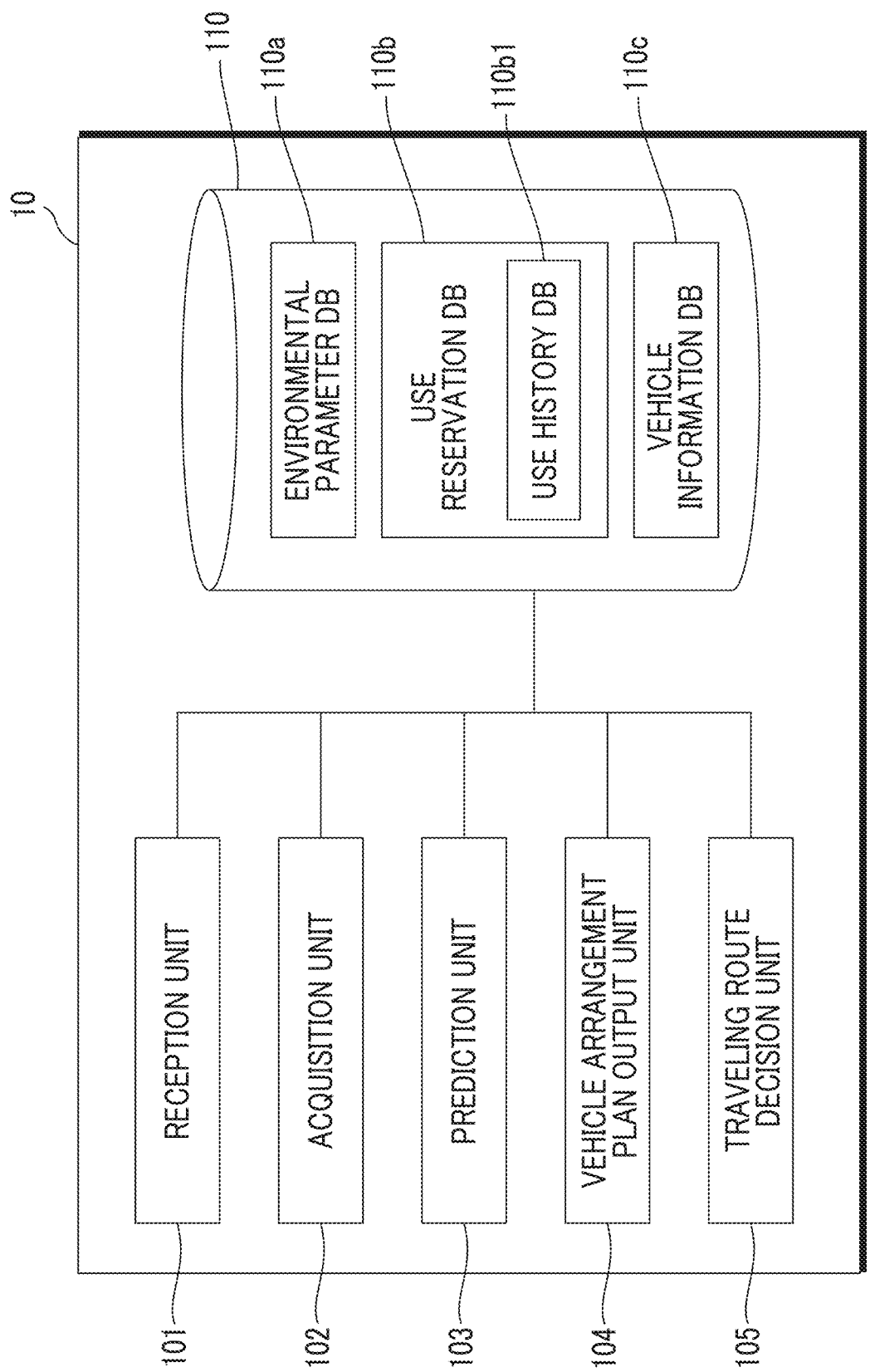
FIG. 2 is a diagram showing an example of the functional block configuration of an information processing apparatus.

FIG. 2 is a diagram showing an example of the functional block configuration of the information processing apparatus 10. The information processing apparatus 10 includes a reception unit 101, an acquisition unit 102, a prediction unit 103 (demand prediction unit), a vehicle arrangement plan output unit 104, a traveling route decision unit 105, and a storage unit 110. In the embodiment, the information processing apparatus 10 does not need to have all of the functions shown in FIG. 2, and may have at least a part of the functions shown in FIG. 2. The information processing apparatus 10 may have functions other than the functions shown in FIG. 2.

The reception unit 101, the acquisition unit 102, the prediction unit 103, the vehicle arrangement plan output unit 104, and the traveling route decision unit 105 can be implemented by a central processing unit (CPU) of the information processing apparatus 10 executing a program stored in a memory. The program can be stored in a recording medium. The recording medium storing the program may be a non-transitory recording medium. The non-transitory recording medium is not particularly limited, and may be, for example, a recording medium, such as a universal serial bus (USB) memory or a compact disc read only memory (CD-ROM). The storage unit 110 can be implemented using a memory or a storage device in the information processing apparatus 10.

The storage unit 110 stores an environmental parameter database (hereinafter, referred to as an "environmental parameter DB") 110a, a use reservation database (hereinafter, referred to as a "use reservation DB") 110b, and a vehicle information database (hereinafter, referred to as a "vehicle information DB") 110c. In the environmental parameter DB 110a, information relating to weather information, map information, time information, traffic information (traffic condition of a road, such as congestion) in a predetermined area is stored. In the use reservation DB 110b, information relating to a use section, a use time, and vehicle information of a vehicle scheduled to be used by the user is stored corresponding to information relating to the user who registers use in the car sharing system 1. In the vehicle information DB 110c, information relating to the vehicle 30 including various vehicle types or colors, a location for storage of the vehicle 30 corresponding to the above-described information, and the like are stored.

The reception unit 101 receives a use reservation for car sharing including the use section, the use time, and the vehicle information (color, vehicle type, accessory, or the like of the vehicle) of the vehicle from the user and stores the use reservation in the use reservation DB 110b. Among data stored in the use reservation DB 110b, information relating to a vehicle actually used by the user is stored in the use history DB 110b1.

The acquisition unit 102 acquires an environmental parameter including weather information, time information, map information, traffic information (traffic condition of a road, such as congestion), and the like of a predetermined area and stores the environmental parameter in the environmental parameter DB 110a. Information stored in the environmental parameter DB 110a and the use history stored in the above-described use history DB 110b are stored in the storage unit 110 in association with each other.

The prediction unit 103 performs a demand prediction of a vehicle to be used by the user based on correspondence information with information stored in the environmental parameter DB 110a and the use history stored in the use history DB 110b1 stored in association with each other. The prediction unit 103 predicts, for example, the number of demanded vehicles in a specific area (specific station), a vehicle having a vehicle type or a color in great demand, and a vehicle mounted with an accessory in great demand based on the above-described correspondence information. Details of the correspondence information will be described below referring to FIG. 8.

The vehicle arrangement plan output unit 104 outputs an arrangement plan of vehicles based on the demand prediction of the vehicle of the prediction unit 103. For example, as a result of the demand prediction of the prediction unit 103, an arrangement plan for arranging, at a specific station where the number of demanded vehicles is large, more vehicles than other stations is output. For example, as a result of the demand prediction of the prediction unit 103, an arrangement plan for arranging, at a specific station where a vehicle having a specific vehicle type, a specific color, or a specific accessory mounted therein is in great demand, more vehicles having the vehicle type, the color, or the accessory is output. A specific example of the vehicle arrangement plan will be described below referring to FIGS. 9 and 10.

The traveling route decision unit 105 decides a traveling route along which the vehicle 30 should travel. In the embodiment, the traveling route decision unit 105 decides a traveling route from a location where the usable vehicle 30 among the vehicles 30 registered in the car sharing system 1 is stored toward an arrangement location of a vehicle output from the vehicle arrangement plan output unit 104. When the usable vehicle 30 is the autonomous driving vehicle 30, the information processing apparatus 10 notifies the in-vehicle device 30a of the vehicle 30 of the traveling route decided by the traveling route decision unit 105. The autonomous driving vehicle 30 receiving the notification is controlled to the arrangement location of the vehicle output from the vehicle arrangement plan output unit 104 depending on the decided traveling route. In this way, the information processing apparatus 10 in the embodiment may include a notification function (notification unit) of giving notification to the in-vehicle device 30a of the vehicle 30. The information processing apparatus 10 may include a control function (controller) of performing control such that the in-vehicle device 30a allows the autonomous driving vehicle 30 receiving the notification to be autonomously driven to the arrangement location of the vehicle output from the vehicle arrangement plan output unit 104.

The traveling route decision unit 105 is not limited as deciding the traveling route from the storage location of the vehicle 30 registered in the car sharing system 1 to the arrangement location of the vehicle output from the vehicle arrangement plan output unit 104. For example, when the user uses so-called one-way car sharing in which a vehicle rented from a specific station is returned to another station, the traveling route decision unit 105 may decide a traveling route from a return station set by the user (a destination set by the user) for returning the vehicle to the arrangement location of the vehicle output from the vehicle arrangement plan output unit 104. In addition, the decision of the traveling route in the traveling route decision unit 105 includes various aspects in which a traveling route from a predetermined area to an area different from the predetermined area is decided.

In the embodiment, a method of arranging the vehicle at the arrangement location of the vehicle output from the vehicle arrangement plan output unit 104 is not limited as controlling and arranging the autonomous driving vehicle 30. For example, a specific driver (for example, an owner, a salesperson, or the like) may drive the vehicle 30 and may arrange the vehicle 30 at the arrangement location of the vehicle output from the vehicle arrangement plan output unit 104.

Subsequently, specific examples of the environmental parameter DB 110*a*, the use reservation DB 110*b*, and the vehicle information DB 110*c* will be described.

FIG. 3 is a table showing an example of the environmental parameter DB 110*a*. In "date" and "time", previous schedule and time registered in advance in the car sharing system 1 are stored. In "location", any location registered in advance in the car sharing system 1 is stored. In "weather", weather information of a predetermined area is stored corresponding to date and time. In regards to "date", "time", and "location", for example, an owner who owns a predetermined number of vehicles may set the period and the area in advance. The owner may set, for example, such that weather information around an area where a car sharing system business is scheduled to start is stored in the environmental parameter DB 110*a*, or weather information of all areas in the country may be stored in the environmental parameter DB 110*a*.

FIG. 4 is a table showing an example of the use reservation DB 110*b*. Information actually used by the user in the use reservation DB 110*b* is stored in the use history DB 110*b*1.

In "user ID" shown in FIG. 4, an identifier for uniquely identifying the user in the car sharing system 1 is stored. In "vehicle type", "color", and "accessory", the type (for example, the vehicle type, color, accessory, or the like of the vehicle) of a vehicle that the user reserves use, the color of the vehicle, and various devices (for example, including a navigation device, a seat for children, and any devices mountable in the vehicle) mounted in the vehicle are stored.

In "various kinds of information" shown in FIG. 4, while any information of a use reservation of the user can be stored, a use period of the vehicle to be used by the user is stored. Furthermore, in "various kinds of information", for example, a use method of car sharing designated by the user is stored. Specifically, designation of any one of the round-trip car sharing and the one-way car sharing is stored. In "getting-in point" of "getting-in place", information (address, latitude and longitude, or the like) indicating a point where the user desires to get in the vehicle 30 is stored. In "departure date and time" of "getting-in place", date and time on which the user desires to depart from the getting-in point" is stored. In "return date and time" of "getting-in place", date and time on which the user who desires the round-trip car sharing desires to finally return to the getting-in place is stored. In a case of a user who desires the one-way car sharing, none is set in "return date and time" of "getting-in place". In "getting-off point" of "getting-off place", information (address, latitude and longitude, or the like) indicating a point where the user desires to get off the vehicle 30 is stored. In "departure date and time" of "getting-off place", date and time on which the user who desires the round-trip car sharing desires to get in the vehicle 30 and depart from the getting-off place is stored.

In the example of FIG. 4, a user having a user ID "U01" uses the one-way car sharing, and registers a use reservation for getting in the vehicle 30 at home on January 15 and getting off the vehicle 30 at a store M. A user having a user ID "U02" uses the round-trip car sharing, and registers a use reservation for getting in the vehicle 30 at home on January 15, 10:00, getting off the vehicle 30 at the store M, departing from the store M on January 15, 14:00, and returning home on January 15, 17:00.

In "departure date and time", the whole or a part of the date and the time may be omitted when the user desires. For example, this means that the user U01 does not particularly desire the time of departure from home on January 15 (may depart from home at any time).

FIG. 5 is a table showing an example of the vehicle information DB 110*c*. In "vehicle ID", an identifier for uniquely identifying the vehicle 30 in the car sharing system 1 is stored. The vehicle ID may be, for example, a license number of the vehicle 30. In "vehicle type", a vehicle type or a manufacturer name of the vehicle 30 is stored. In "capacity", a seating capacity of the vehicle 30 is stored. In "availability information", information indicating whether the vehicle 30 is usable or in use is stored. In "storage location", information indicating a location where the vehicle 30 is stopped is stored. Since the storage location is also a location (a location capable of getting-in) where a user who holds a role of a driver can get in the vehicle 30, the storage location may be called a station where the vehicle 30 is rented.

Processing Procedure

Figure 6:
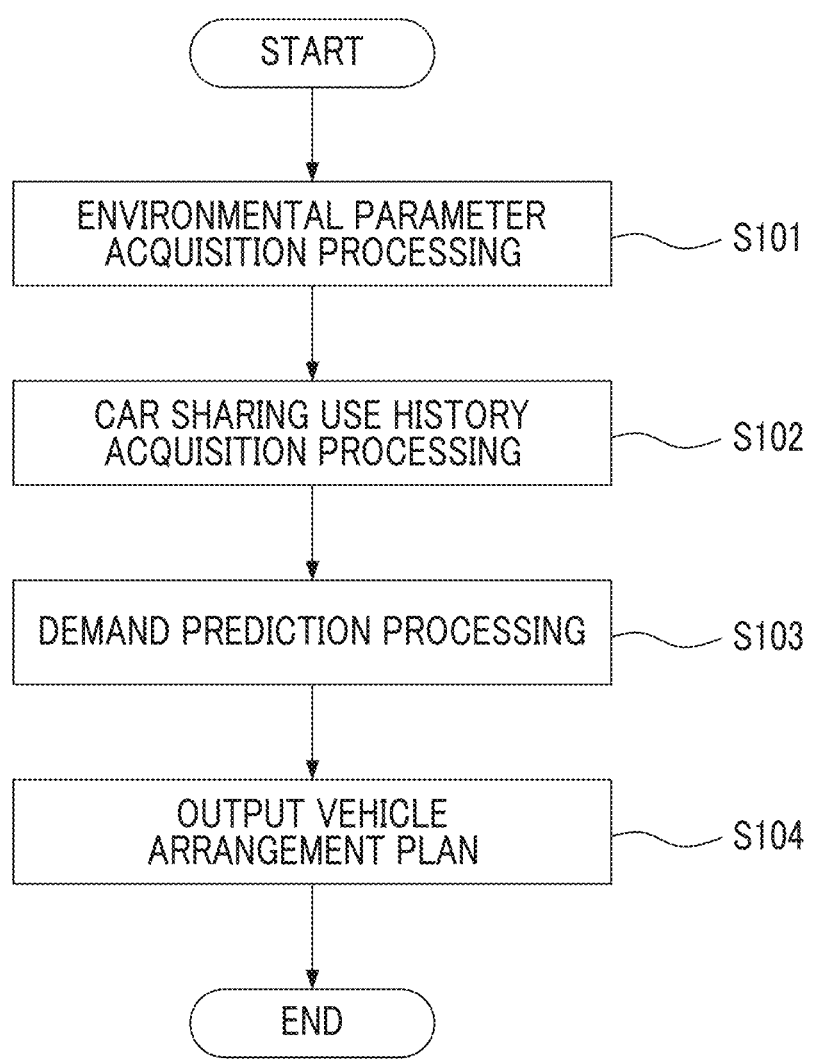
FIG. 6 is a flowchart showing an example of a processing procedure that is executed by the information processing apparatus.

Subsequently, a processing procedure that is executed by the information processing apparatus 10 will be described. FIG. 6 is a flowchart showing an example of a processing procedure that is executed by the information processing apparatus 10. Note that processing of Steps S101 and S102 described below may be omitted when a state in which predetermined data is stored in a database (storage unit 110) in advance is premised.

In Step S101, the acquisition unit 102 stores weather information and the like (including weather, location, time, and the like) corresponding to date and time, and a location in a predetermined period in the environmental parameter DB 110*a*. While the acquisition unit 102 receives an input from an owner who desires an output of an arrangement plan of vehicles, for example, and stores the above-described weather information and the like in the environmental parameter DB 110*a*, the acquisition unit 102 may store weather information and the like of a predetermined area in a previous entire period in the environmental parameter DB 110*a* regardless of an input from the owner.

In Step S102, the reception unit 101 receives a use reservation for car sharing from the user who desires to use car sharing and stores the use reservation in the use reservation DB 110*b*. Among data stored in the use reservation DB 110*b*, history information actually used by the user is stored in the use history DB 110*b*. In receiving the use reservation, the reception unit 101 may display a screen for receiving a use reservation in the user terminal 20 of the user who desires the use reservation. While the user can use car sharing in various aspects, for example, the user inputs designation of any one of the round-trip car sharing and the one-way car sharing, a getting-in point, a time of departure from a getting-in place, a getting-off point, a time of departure from the getting-off point, and the like on the screen, thereby registering a desired use reservation in the information processing apparatus 10.

Figure 7:
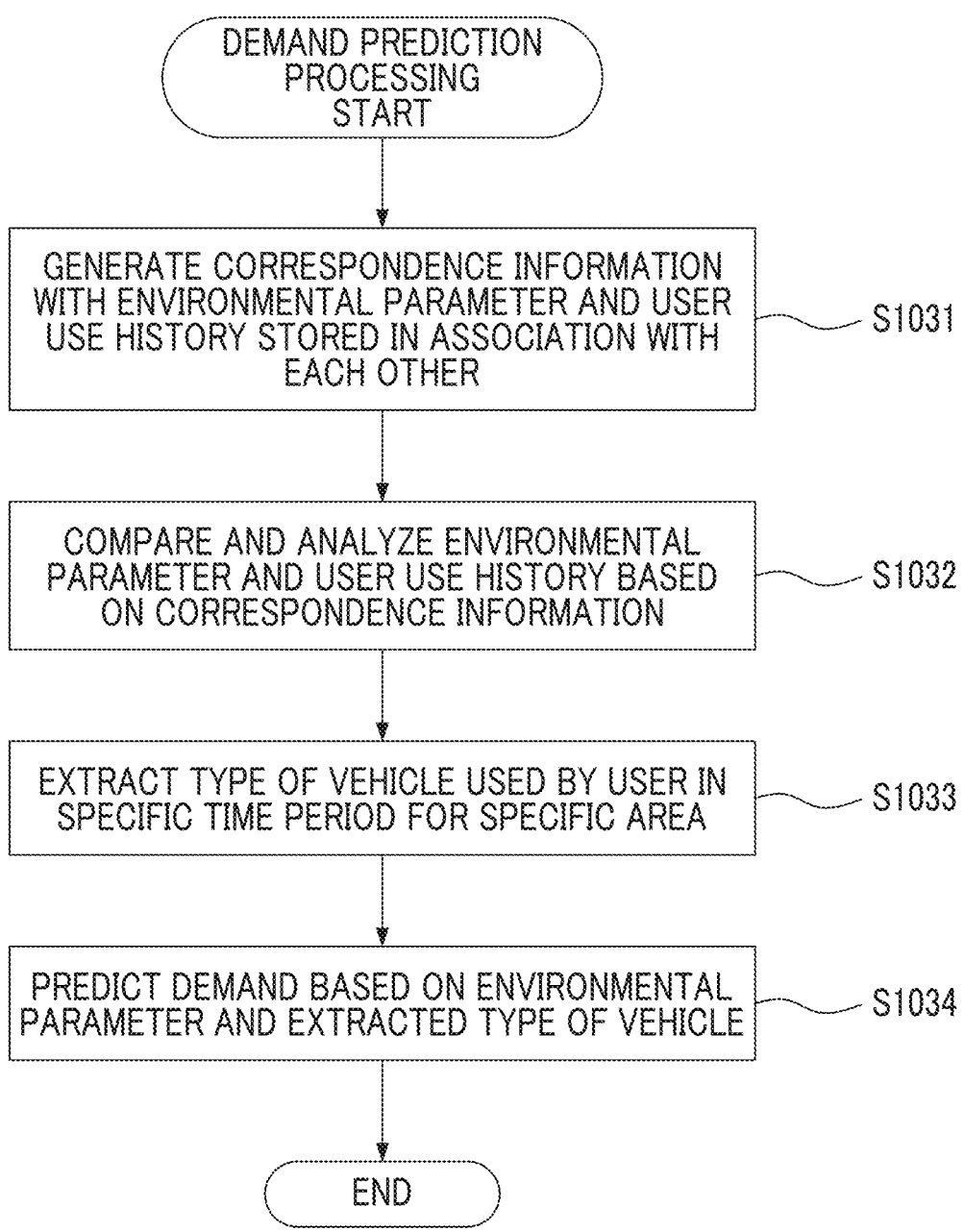
FIG. 7 is a flowchart showing an example of demand prediction processing shown in FIG. 6.

In Step S103, the prediction unit 103 performs a demand prediction of a vehicle to be used by the user based on correspondence information with the environmental parameter (including at least weather information and time information in a predetermined area) stored in the environmental parameter DB 110a and the use history of the user stored in the use history DB 110b1 stored in association with each other. Hereinafter, demand prediction processing that is executed by the prediction unit 103 will be described. FIG. 7 is a flowchart showing an example of the demand prediction processing shown in FIG. 6.

First, as shown in Step S1031 of FIG. 7, the correspondence information with the above-described environmental parameter and the use history of the user stored in association with each other is generated. An example of the correspondence information is shown in FIG. 8.

Next, as shown in Steps S1032 and S1033 of FIG. 7, the prediction unit 103 compares and analyzes the environmental parameter and the use history of the user based on the correspondence information and extracts the type of a vehicle used by the user in a specific time period for each specific area.

For example, the following information can be extracted based on the correspondence information of FIG. 8. In detail, information that users having user IDs "U01", "U02", "U03" use the vehicle 30 having a vehicle type "XXX" as the type of the vehicle 30 in A-Ku, Tokyo in a use time period (a time period during weather is cloudy) of, for example, 10:00 to 11:00 of the use time of each user can be extracted. For the use time (10:00 to 11:00), the color of the vehicle 30 used by each user is different, the color of the vehicle 30 used by the user having the user ID "U01" is white, the color of the vehicle 30 used by the user having the user ID "U02" is black, and the color of the vehicle 30 used by the user having the user ID "U03" is dark blue.

As shown in Step S1034 of FIG. 7, the prediction unit 103 predicts demand for each type of vehicle based on the type of the vehicle (the vehicle type, color, accessory, and the like of the vehicle 30 used by the user) extracted in Step S1033 and the environmental parameter. For example, the prediction unit 103 can perform a demand prediction that demand for the vehicle 30 having the vehicle type "XXX" in the time period (the time period during which weather is cloudy) of 10:00 to 11:00 of an area in A-Ku, Tokyo shown in FIG. 8 is greater than other areas, demand for the vehicle 30 in the same time period of an area in B-Shi, Kanagawa-Ken is small, and the like. For example, the prediction unit 103 can perform a demand prediction that there is demand for the vehicle 30 having the vehicle type "XXX" in a time period (a time period during which weather is fine) of 16:00 to 17:00 of the area in B-Shi, Kanagawa-Ken, demand for the vehicle 30 having the vehicle type "XXX" of the area in B-Shi, Kanagawa-Ken is relatively smaller than demand for the vehicle 30 having the vehicle type "XXX" in the time period of 10:00 to 11:00 of the area in A-Ku, Tokyo, and the like.

Figure 9:
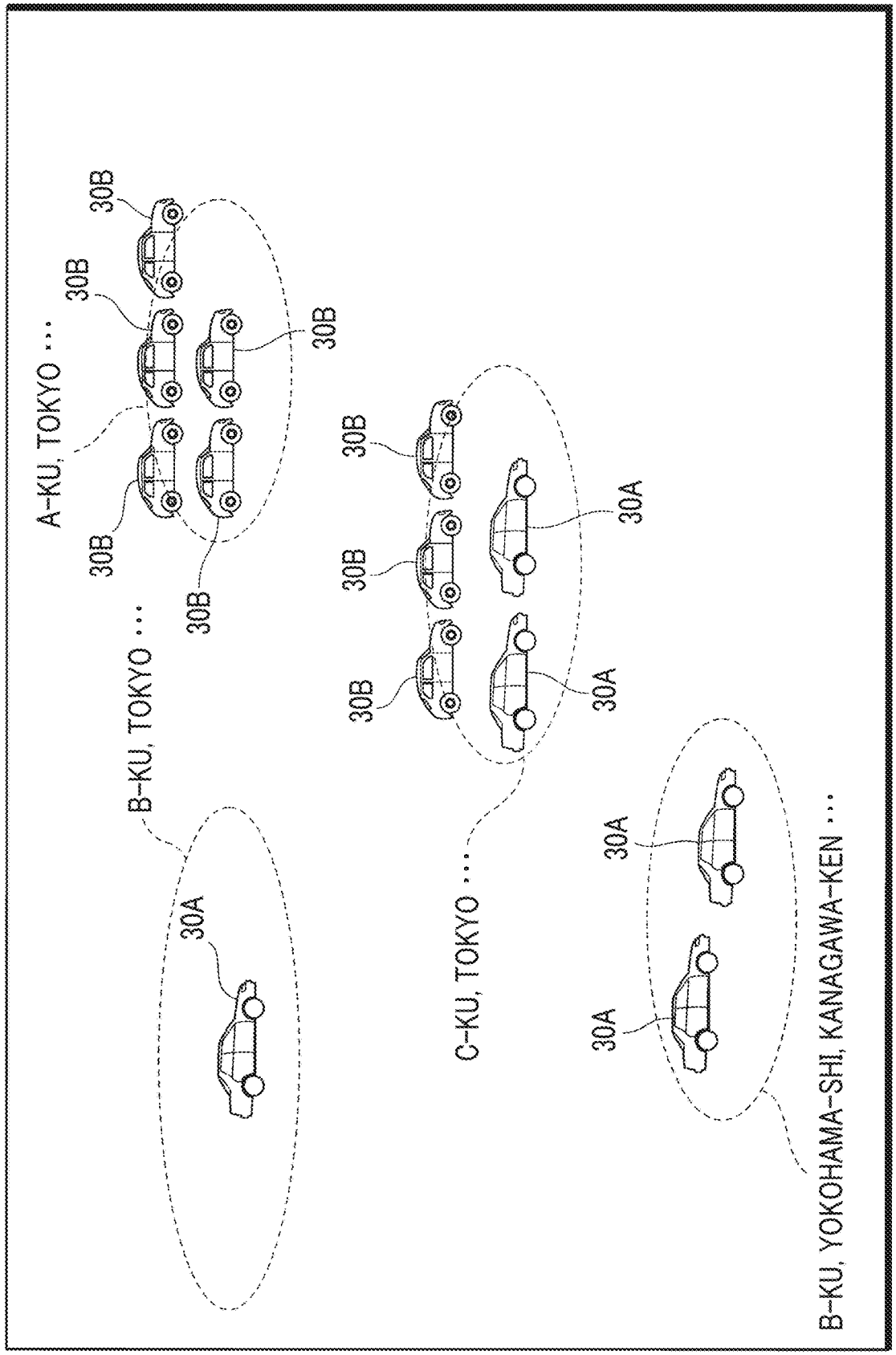
FIG. 9 is a diagram showing an example of a vehicle arrangement plan.

In Step S104 subsequent to Step S103 of FIG. 6, the vehicle arrangement plan output unit 104 outputs the arrangement plan of the vehicles 30 based on the demand prediction of the vehicle 30 of the prediction unit 103. FIG. 9 shows an example of the arrangement plan of the vehicles 30 output from the vehicle arrangement plan output unit 104.

FIG. 9 is a diagram showing an example of arrangement of vehicles output from the vehicle arrangement plan output unit 104 based on the demand prediction of the vehicle 30 of the prediction unit 103. In the example of the vehicle arrangement shown in FIG. 9, a situation in which a predetermined number of vehicles having different vehicle types (two vehicle types) are arranged based on a demand prediction of vehicles in four different areas is assumed.

In the example shown in the drawing, as a result of the demand prediction of the prediction unit 103, a different number of vehicles are arranged according to an area where the number of demand predicted vehicles is great (that is, an area where the vehicle is in great demand). Specifically, an example where the number of demand predicted vehicles 30B in A-Ku, Tokyo is five (the number of vehicles 30B having a vehicle type B is five), the number of demand predicted vehicles in C-Ku, Tokyo is five (the number of vehicles 30A having a vehicle type A is two, and the number of vehicles 30B having the vehicle type B is three), the number of demand predicted vehicles in B-Ku, Yokohama-Shi, Kanagawa-Ken is two (the number of vehicles 30A having the vehicle type A is two), and the number of demand predicted vehicles in B-Ku, Tokyo is one (the number of vehicles 30A having the vehicle type A is one) is shown.

From a viewpoint of the number of demand predicted vehicles by vehicle type in the drawing, the number of demand predicted vehicles 30B having the vehicle type B is greatest in A-Ku, Tokyo, is second greatest in C-Ku, Tokyo, and is smallest in B-Ku, Tokyo and B-Ku, Yokohama-Shi, Kanagawa-Ken. The number of demand predicted vehicles 30A having the vehicle type A is greatest in C-Ku, Tokyo and B-Ku, Yokohama-Shi, Kanagawa-Ken, is second greatest in B-Ku, Tokyo, and is smallest in A-Ku, Tokyo. In this way, the arrangement plan of the vehicles (the arrangement locations of the vehicles and the number of vehicles) is output based on the demand prediction predicted by vehicle type for each area.

Figure 10:
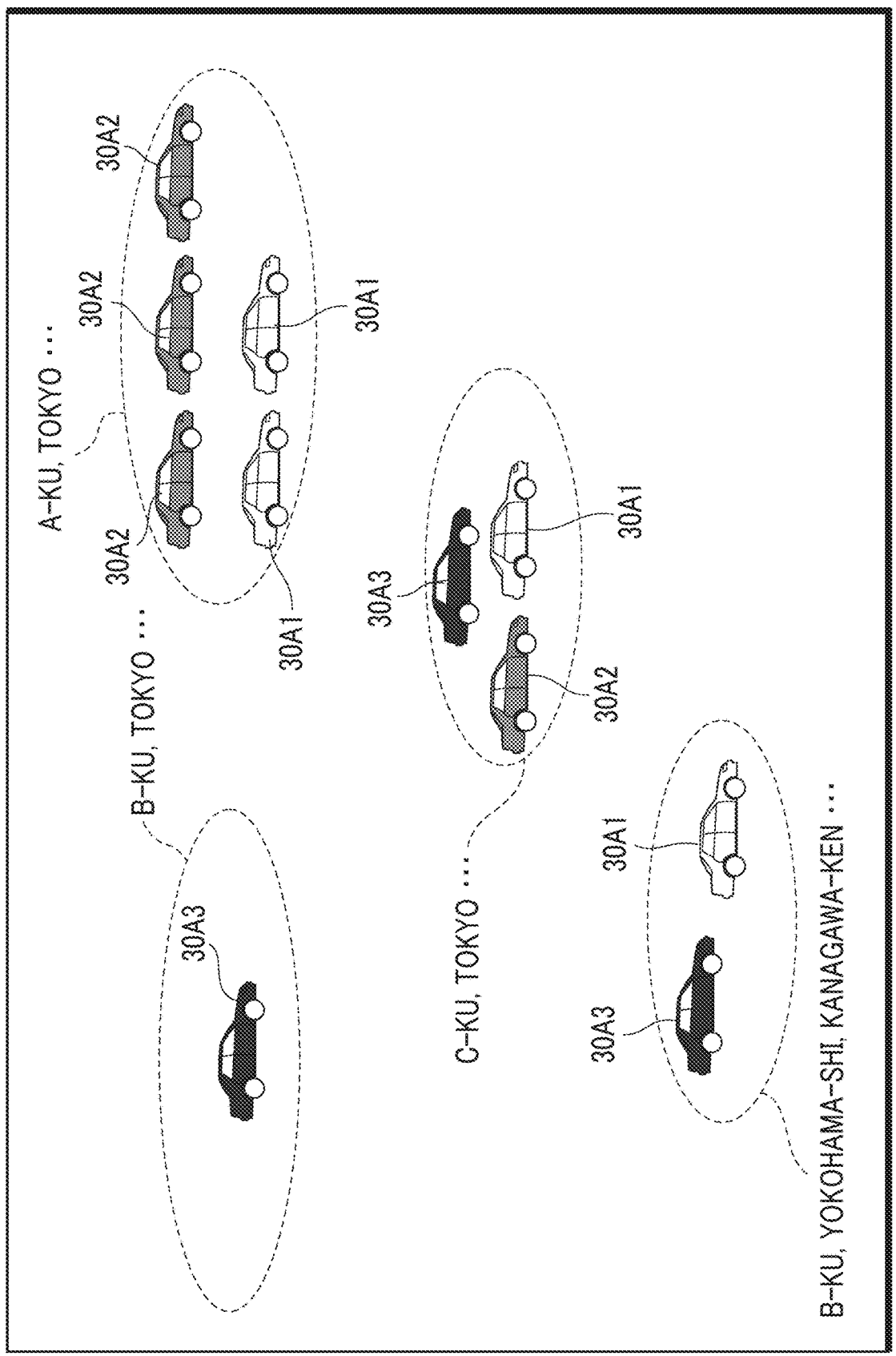
FIG. 10 is a diagram showing another example of the vehicle arrangement plan.

In FIG. 9, although, as an example of the vehicle arrangement plan output from the vehicle arrangement plan output unit 104, an example where a predetermined number of vehicles having different vehicle types are arranged has been shown, the disclosure is not limited thereto, and a predetermined number of vehicles may be arranged according to the color of the vehicle in great demand in each area. FIG. 10 shows an example where vehicles having different colors are arranged in four different areas based on the demand prediction of the prediction unit 103, respectively. In the example shown in FIG. 10, the vehicles having the same vehicle type are arranged in all areas.

In the example of the vehicle arrangement plan output from the vehicle arrangement plan output unit 104 shown in FIG. 10, vehicles are arranged in each area based on a prediction of the prediction unit 103 for a vehicle having a color in great demand as follows. That is, three grey vehicles 30A2 and two white vehicles 30A1 are arranged in A-Ku, Tokyo, one black vehicle 30A3 is arranged in B-Ku, Tokyo, one black vehicle 30A3, one grey vehicle 30A2, and one white vehicle 30A1 are arranged in C-Ku, Tokyo, and one black vehicle 30A3 and one white vehicle 30A1 are arranged in B-Ku, Yokohama-Shi, Kanagawa-Ken.

As shown in FIGS. 9 and 10, the prediction unit 103 predicts the level of demand for the vehicle type or color of the vehicle for each area, and the vehicle arrangement plan output unit 104 outputs an arrangement plan of vehicles according to the prediction of demand. Although FIGS. 9 and 10 show examples of a case where vehicles having different vehicle types are arranged and a case where vehicles having different colors are arranged, respectively, the vehicle arrangement plan output unit 104 may output arrangement of vehicles in which vehicle types and colors are combined.

In addition to the examples shown in FIGS. 9 and 10, the prediction unit 103 may predict demand for an accessory of a vehicle for each area, and the vehicle arrangement plan output unit 104 may output arrangement of vehicles based on the prediction. In addition, demand for each area can be predicted based on a history previously used by the user, and the vehicle arrangement plan output unit 104 can output a vehicle arrangement plan in various forms based on the demand prediction.

As described above, the prediction unit 103 performs the demand prediction of the vehicle information (including a color, a vehicle type, an accessory, and the like of the vehicle) used by the user for each predetermined area, and the vehicle arrangement plan output unit 104 outputs the arrangement location of the vehicle corresponding to the vehicle information, the number of vehicles, and the like based on the demand prediction of the vehicle information for each predetermined area.

In the embodiment described above, the acquisition unit 102 may further acquire a road situation or a degree of congestion of a road (including a traffic situation of a road, or the like) in a predetermined area, and the vehicle arrangement plan output unit 104 may output an arrangement plan of vehicles based on the demand prediction of the vehicle of the prediction unit 103 and the degree of congestion of the road.

According to the embodiment described above, the prediction unit 103 performs a demand prediction based on the above-described environmental parameter and the use history of the user, and the vehicle arrangement plan output unit 104 outputs the arrangement plan of the vehicles based on a prediction result. Since the demand prediction is, for example, a prediction in consideration of parameters including an area where there are many use reservations for a vehicle of the users, a time period of congestion, weather information, and the like, it is possible to cope with a situation in which the degree of uneven distribution increases before the degree of uneven distribution actually increases compared to a configuration in which processing for decreasing the degree of uneven distribution in a stopgap manner according to the current degree of uneven distribution of vehicles is executed. That is, since the owner can ascertain a time period during which a vehicle is shared, a location where a vehicle is shared, weather when a vehicle is shared, a type of vehicle to be shared, it is possible to improve availability of vehicles owned by the owner. As a result, it is possible to provide a car sharing system capable of renting vehicles to more users.

The above-described embodiment is for facilitating the understanding of the disclosure and is not to be interpreted to limit the disclosure. The flowchart described in the embodiment, a sequence, elements in the embodiment, and arrangement, material, condition, shape, size, and the like of each of the elements are not limited to those described above and can be appropriately modified. In addition, components described in different embodiments can be partially substituted with each other or can be combined with each other.

What is claimed is:

1. An information processing apparatus comprising:
   an environmental parameter acquisition unit configured to acquire at least one of weather information and time information of a predetermined area as an environmental parameter;
   a use history unit configured to acquire a use history including a use section, a use time, and vehicle information of a vehicle previously used by a user, the vehicle information includes a color, a vehicle type, and an accessory of the vehicle;
   a demand prediction unit configured to:
     perform a demand prediction of a vehicle to be used by the user based on correspondence information with the environmental parameter and the use history stored in association with each other; and
     perform the demand prediction of the vehicle to be used by the user for the predetermined area, the vehicle to be used by the user corresponding to the vehicle information; and
   a vehicle arrangement plan output unit configured to:
     output a plan of arrangement locations of vehicles planned based on the demand prediction of the vehicle to be used by the user performed by the demand prediction unit; and
     notify, through a communication network, an in-vehicle device of each of the vehicles of an arrangement location of the plan of arrangement locations; and
     output arrangement locations of the vehicles corresponding to the vehicle information and a number of the vehicles for the predetermined area based on the demand prediction of the vehicle to be used by the user corresponding to the vehicle information;
   a reception unit configured to receive a user reservation of a vehicle and store the user reservation in a user reservation database;
   a traveling route decision unit configured to decide a traveling route from a location where a vehicle determined as being usable based on the use reservation is parked, toward the arrangement location of the vehicle output from the vehicle arrangement plan output unit;
   a notification unit configured to notify the vehicle determined as being usable based on the user reservation, of the traveling route decided by the traveling route decision unit, the vehicle being an autonomous driving vehicle; and
   a controller configured to control the vehicle notified by the notification unit, to the arrangement location of the vehicle output from the vehicle arrangement plan output unit along the traveling route.

2. The information processing apparatus according to claim 1, wherein:
   the environmental parameter acquisition unit is configured to further acquire a degree of congestion of a road in the predetermined area; and
   the vehicle arrangement plan output unit is configured to output the plan of arrangement locations of the vehicles planned based on the demand prediction of the vehicle performed by the demand prediction unit and the degree of congestion of the road.

3. An information processing apparatus comprising:
   an environmental parameter acquisition unit configured to:
     acquire at least one of weather information and time information of a predetermined area as an environmental parameter; and
     acquire a degree of congestion of a road in the predetermined area;
   a use history unit configured to acquire a use history including a use section, a use time, and vehicle information of a vehicle previously used by a user;
   a demand prediction unit configured to perform a demand prediction of a vehicle to be used by the user based on correspondence information with the environmental parameter and the use history stored in association with each other; and
   a vehicle arrangement plan output unit configured to:
     output a plan of arrangement locations of vehicles planned based on the demand prediction of the vehicle performed by the demand prediction unit;

notify, through a communication network, an in-vehicle device of each of the vehicles of an arrangement location of the plan of arrangement locations; and output the plan of arrangement locations of the vehicles planned based on the demand prediction of the vehicle performed by the demand prediction unit and the degree of congestion of the road;

a reception unit configured to receive a user reservation of a vehicle and store the user reservation in a user reservation database;

a traveling route decision unit configured to decide a traveling route from a location where a vehicle determined as being usable based on the user reservation is parked, toward the arrangement location of the vehicle output from the vehicle arrangement plan output unit;

a notification unit configured to notify the vehicle determined as being usable based on the use reservation, of the traveling route decided by the traveling route decision unit, the vehicle being an autonomous driving vehicle; and a controller configured to control the vehicle notified by the notification unit, to the arrangement location of the vehicle output from the vehicle arrangement plan output unit along the traveling route.

4. An information processing apparatus comprising:

an environmental parameter acquisition unit configured to acquire at least one of weather information and time information of a predetermined area as an environmental parameter;

a use history unit configured to acquire a use history including a use section, a use time, and vehicle information of a vehicle previously used by a user;

a demand prediction unit configured to perform a demand prediction of a vehicle to be used by the user based on correspondence information with the environmental parameter and the use history stored in association with each other; and a vehicle arrangement plan output unit configured to:

output a plan of arrangement locations of vehicles planned based on the demand prediction of the vehicle to be used by the user performed by the demand prediction unit; and notify, through a communication network, an in-vehicle device of each of the vehicles of an arrangement location of the plan of arrangement locations;

a reception unit configured to receive a user reservation of a vehicle and store the user reservation in a user reservation database; and a traveling route decision unit configured to decide a traveling route from a location where a vehicle determined as being usable based on the use reservation is parked, toward the arrangement location of the vehicle output from the vehicle arrangement plan output unit;

a notification unit configured to notify the vehicle determined as being usable based on the use reservation, of the traveling route decided by the traveling route decision unit, the vehicle being an autonomous driving vehicle; and a controller configured to control the vehicle notified by the notification unit, to the arrangement location of the vehicle output from the vehicle arrangement plan output unit along the traveling route.

* * * * *